United States Patent [19]
Karabinis

[11] Patent Number: 6,052,586
[45] Date of Patent: Apr. 18, 2000

[54] FIXED AND MOBILE SATELLITE RADIOTELEPHONE SYSTEMS AND METHODS WITH CAPACITY SHARING

[75] Inventor: Peter D. Karabinis, Cary, N.C.

[73] Assignee: Ericsson Inc., Research Triangle Park, N.C.

[21] Appl. No.: 08/920,596

[22] Filed: Aug. 29, 1997

[51] Int. Cl.[7] .................................................. H04Q 7/20
[52] U.S. Cl. .................... 455/427; 455/12.1; 455/13.1
[58] Field of Search .............................. 455/13.1, 13.2, 455/427, 435, 12.1

[56] References Cited

U.S. PATENT DOCUMENTS

| | | | |
|---|---|---|---|
| 4,872,015 | 10/1989 | Rosen | 342/353 |
| 5,487,101 | 1/1996 | Fletcher | 455/435 |
| 5,625,868 | 4/1997 | Jan et al. | 455/13.4 |
| 5,634,190 | 5/1997 | Wiedeman | 455/13.1 |
| 5,640,386 | 6/1997 | Wiedeman | 455/13.1 |
| 5,920,804 | 7/1999 | Armbruster et al. | 455/13.2 |

*Primary Examiner*—Dwayne D. Bost
*Assistant Examiner*—Myran K. Wyche
*Attorney, Agent, or Firm*—Myers Bigel Sibley & Sajovec

[57] ABSTRACT

A mobile satellite radiotelephone system uses some of the capacity of a fixed satellite radiotelephone system in areas of congestion. Capacity sharing is obtained by providing at least one fixed retransmitting station in an area of overlap between the fixed and mobile satellite radiotelephone systems. The fixed retransmitting station retransmits communications between the fixed satellite radiotelephone system and at least one of the mobile radiotelephones in the vicinity thereof. The fixed retransmitting station communicates with the mobile radiotelephones using the mobile radiotelephone air interface, so that the communication is transparent to the mobile radiotelephones.

26 Claims, 3 Drawing Sheets

FIXED AND MOBILE SATELLITE RADIOTELEPHONE SYSTEMS AND METHODS WITH CAPACITY SHARING

FIELD OF THE INVENTION

This invention relates to radiotelephone systems and methods, and more particularly to satellite radiotelephone systems and methods.

BACKGROUND OF THE INVENTION

Satellite radiotelephone systems are being developed and deployed at many locations around the world. Satellite radiotelephone systems are often used where rugged terrain or lack of population density may preclude use of conventional mobile radiotelephones or fixed (wire) telephones. The design and operation of satellite radiotelephone systems are well known to those having skill in the art and need not be described further herein. It will be understood that radiotelephone systems can be used for voice and data communications, so that radiotelephones can include terminals such as PCS terminals.

Satellite radiotelephone systems may be broadly classified into two types: mobile satellite radiotelephone systems and fixed satellite radiotelephone systems. In both types of systems, one or more satellites are used to communicate with radiotelephones. The satellites may be orbiting satellites or geostationary satellites. A mobile satellite radiotelephone system is designed to communicate with a plurality of mobile radiotelephones of similar size as conventional cellular radiotelephones. In contrast, a fixed satellite radiotelephone system is designed to communicate with a plurality of fixed (nonmobile) radiotelephones using permanent or semi-permanent fixed antennas which may be mounted on buildings or homes.

The capacity of fixed satellite radiotelephone systems is generally relatively large. The term "capacity" is used to refer to the number of radiotelephones with which the satellite radiotelephone system can communicate simultaneously.

The per satellite capacity of a satellite radiotelephone system is generally limited by the amount of satellite power that is expended per communications circuit in order to establish and maintain communications with a radiotelephone. Another limiting factor of satellite radiotelephone system capacity may be the available frequency spectrum and the typically poor frequency reuse of satellite radiotelephone systems.

Mobile satellite radiotelephone systems generally have a much lower capacity than fixed satellite radiotelephone systems. In particular, the regional and global mobile satellite systems that are currently under development are generally quite limited in capacity. Regional mobile satellite systems involving geostationary satellites may have a capacity per satellite of about 10,000 simultaneous radiotelephone communications. Global mobile satellite systems involving medium earth orbiting (MEO) or low earth orbiting (LEO) satellites generally have even lower capacities per satellite, typically three to four thousand simultaneous radiotelephone communications.

A primary limitation in the per satellite capacity of mobile satellite radiotelephone systems is the amount of power that is expended per communication by the satellite payload in order to establish and maintain communications with the small hand-held mobile phones. Moreover, the practical limitations of forming a very large number of spot beams from the satellite often limits frequency reuse for mobile satellite radiotelephone systems. For these and other reasons, the capacity of mobile satellite radiotelephone systems is generally low.

Fixed satellite radiotelephone systems generally do not include mobile telephone services. Rather, services are delivered to end user homes or businesses via permanently or semi-permanently fixed terminal installations. These installations generally include directional antennas that in some cases are capable of tracking the satellites.

Fixed satellite radiotelephone systems generally have higher capacity than mobile systems. The fixed satellite radiotelephone systems communicate using fixed user terminals which can use relatively large end user antennas. Hence, the satellite power required per equivalent communication can be lower for a fixed system than for a mobile system. Furthermore, frequency allocations for the fixed systems can be more liberal than those of mobile systems for at least two reasons. First, fixed systems generally operate at higher frequencies such as C-band or above, where the frequency spectrum is not as crowded. Second, the user terminals are fixed and use highly directional antennas so that angular separation between satellites can be relied upon for frequency reuse.

Due to the relatively limited capacity of mobile satellite radiotelephone systems, capacity bottlenecks or "hot spots" may develop in congested areas of the mobile satellite radiotelephone system, where the mobile satellite radiotelephone system does not have enough capacity to accommodate all users. It may be difficult to increase the capacity of the mobile satellite system in these congested areas.

SUMMARY OF THE INVENTION

It is therefore an object of the invention to provide improved fixed and mobile satellite radiotelephone systems and methods.

It is yet another object of the invention to provide mobile satellite radiotelephone systems and methods which can increase capacity in congested areas.

These and other objects are provided, according to the present invention, by allowing a mobile satellite radiotelephone system to use some of the capacity of a fixed satellite radiotelephone system in areas of congestion. Capacity sharing may be obtained by providing at least one fixed retransmitting station in an area of overlap between the fixed and mobile systems. The station retransmits communications between the fixed satellite radiotelephone system and at least one of the mobile radiotelephones in the vicinity thereof.

The present invention stems from the realization that in many parts of the world, a fixed satellite radiotelephone system and a mobile satellite radiotelephone system will include partially or filly overlapping coverage areas. Accordingly, in these overlapping areas, fixed retransmiting stations may be used to retransmit communications between the fixed satellite radiotelephone system and at least one of the mobile radiotelephones. The fixed retransmiting station communicates with the mobile radiotelephones using the mobile radiotelephone air interface so that the communication is transparent to the mobile radiotelephones. However, by providing at least one fixed retransmiting station, capacity bottlenecks in the overlapping area can be reduced or eliminated.

In particular, satellite radiotelephone systems according to the invention, include a fixed satellite radiotelephone system that communicates with a plurality of fixed radiotelephones in a first communication area, and a mobile satellite radiotelephone system that communicates with a plurality of mobile radiotelephones in a second communication area. The first and second communication areas overlap to define an overlapping area. At least one fixed retransmiting station is provided in the overlapping area, that retransmits communications between the fixed satellite radiotelephone system and at least one of the mobile radiotelephones. It will also be understood that even if the first and second communication areas do not overlap, at least one fixed retransmitting station may be provided in the first area, that retransmits communications between the fixed satellite radiotelephone system and at least one of the mobile radiotelephones.

In one embodiment, the fixed satellite radiotelephone system and the mobile satellite radiotelephone system use a similar air interface. In this embodiment, the at least one fixed retransmiting station can be a non-processing repeater and frequency translator that relays communications between the fixed satellite radiotelephone system and at least one of the mobile radiotelephones.

In another embodiment, the fixed satellite radiotelephone system uses a first air interface, and the mobile satellite radiotelephone system uses a second air interface. In this embodiment, the at least one fixed retransmitting station converts communications between the fixed satellite radiotelephone system and the at least one of the mobile radiotelephones, between the first air interface and the second air interface. Accordingly, the fixed retransmitting station may be a regenerative repeater which reformats the voice and control channels. In either embodiment, at least one fixed retransmitting station can provide additional capacity for the mobile satellite radiotelephone system using at least some of the capacity of the fixed satellite radiotelephone system in a congested area of the mobile satellite radiotelephone system.

The fixed retransmitting station can provide a new type of base station for a satellite radiotelephone system. The base station includes means for locating the base station in an overlapping area of a fixed satellite radiotelephone system and a mobile satellite radiotelephone system. The base station also includes means for retransmiting communications between the fixed satellite radiotelephone system and at least one of the mobile radiotelephones. The base station thereby can provide additional capacity for mobile satellite radiotelephone system in a congested area.

It will be understood by those having skill in the art that the present invention may be used for capacity offload between any two satellite radiotelephone systems. However, preferably, the present invention is used to add capacity to a mobile satellite radiotelephone system using resources of a fixed satellite radiotelephone system. The systems may use a common satellite. However, preferably, the present invention is used to add capacity to a mobile satellite radiotelephone system including a first satellite, using capacity resources of a fixed satellite radiotelephone system including a second satellite. Associated methods are also provided.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
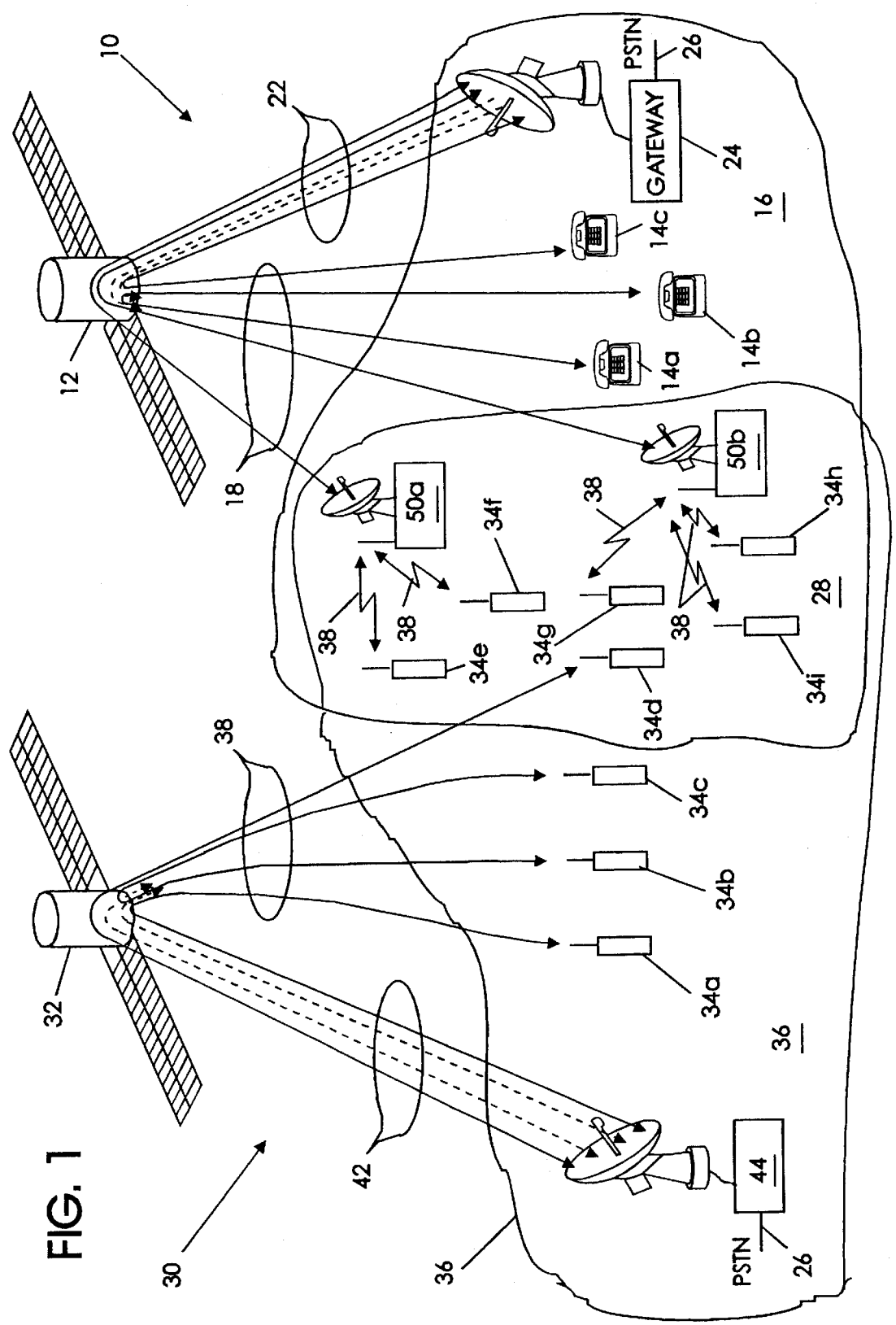
FIG. 1 is an overall diagram of satellite radiotelephone systems and methods according to the present invention.

Referring now to FIG. 1, satellite radiotelephone systems and methods according to the invention will now be described. As shown in FIG. 1, a satellite radiotelephone system includes a fixed satellite radiotelephone system 10 and a mobile satellite radiotelephone system 30. The fixed satellite radiotelephone system 10 uses a first satellite 12 to communicate with a plurality of fixed radiotelephones 14a, 14b and 14c in a first communication area 16.

Fixed satellite radiotelephone communication system 10 communicates with the plurality of fixed radiotelephones 14a–14c using a first air interface 18, for example, C-band. Control of the fixed satellite system 10 may be implemented by a feeder link 22 which communicates with a gateway 24 and the public switched (wire) telephone network (PSTN) 26.

It will be understood by those having skill in the art that the fixed satellite radiotelephone system 10 may include more than one satellite 12 and will typically include large numbers of fixed radiotelephones 14. Moreover, the fixed radiotelephones are generally implemented using a permanent or semi-permanent antenna which may be coupled to multiple radiotelephones. Since the antenna location is fixed, the capacity of the system may be large for the reasons already described.

It will also be understood by those having skill in the art that the feeder link 22 may include communications channels for voice and data communications, and control channels. The control channels are indicated by dashed lines in FIG. 1. The control channels may be used to implement direct communications between fixed radiotelephones, as shown for example between radiotelephones 14a and 14b. The control channels may also be used to effect communications between a fixed satellite radiotelephone 14c and a mobile radiotelephone or a wire telephone via gateway 24 and PSTN 26. The feeder link 22 may use the same air interface or a different air interface from the first air interface 18.

Still referring to FIG. 1, mobile satellite radiotelephone system 30 includes a second satellite 32 that communicates with a plurality of mobile radiotelephones 34a–34d which are located in a second communication area 36. Mobile satellite radiotelephone system 30 communicates with mobile radiotelephones 34 using a second air interface 38, for example at L-band or S-band. Alternatively, the second air interface 38 may be the same as the first air interface 18. However, the frequency bands associated with the two air interfaces will generally be different.

A feeder link 42 may be used to communicate with other satellite, cellular or wire telephone systems via Gateway 44 and PSTN 26. As with fixed satellite system 10, the feeder link 42 may include communications channels shown in solid lines and control channels shown in dashed lines. The control channels may be used to establish direct mobile-to-mobile communications, for example, between mobile radiotelephones 34b and 34c. The control channels may also be used to establish communications between mobile phones 34a and 34d and other satellite, mobile or wire telephone systems.

As with the fixed satellite radiotelephone system 10, the mobile satellite radiotelephone system 30 may employ more than one satellite 32 and will generally communicate with large numbers of mobile radiotelephones 34. The fixed and mobile satellite radiotelephone system may also use a common satellite. The designs of fixed and mobile satellite radiotelephone systems are well-known to those having skill in the art and need not be described further herein.

Still referring to FIG. 1, a congested area may be present in the mobile satellite radiotelephone system 30 where a large number of mobile radiotelephones 34e–34i are present. As also shown in FIG. 1, this congested area may be in an overlapping area 28 between first communication area 16 and second communication area 36. If this is the case, excess capacity from fixed satellite radiotelephone system 10 may be offloaded to mobile satellite radiotelephone system 30, according to the present invention.

Capacity offload may be provided by at least one fixed retransmiting station 50a, 50b, that retransmits communications between the fixed satellite radiotelephone system 10 and at least one of the mobile radiotelephones. For example, as shown in FIG. 1, first fixed retransmiting station 50a retransmits communications between satellite 12 and mobile radiotelephones 34e and 34f. Second fixed transmitting station 50b retransmits communications between the satellite 12 and mobile radiotelephones 34g, 34h and 34i. It will also be understood that the fixed retransmitting station need not be located in an overlapping area as long as it can retransmit communications between the fixed satellite radiotelephone system in the first area, and the mobile radiotelephones.

The fixed retransmiting stations communicate with the satellite 12 using first air interface 18. However, they communicate with the mobile radiotelephones using the second air interface 38. Accordingly, from the standpoint of the mobile radiotelephones 38e–38i, communication is transparent. In other words, it is not apparent to the mobile radiotelephones 34e–34i, or the users thereof, that communications are occurring with the fixed satellite radiotelephone system 10 rather than with the mobile satellite radiotelephone system 30. However, additional capacity for the mobile satellite radiotelephone system 30 in the congested areas adjacent the fixed retransmitting stations 50 may be provided.

Operation of satellite radiotelephone systems and methods according to the present invention will now be further described. According to the invention, a mobile radiotelephone can establish a communications link via the facilities of the fixed satellite radiotelephone system, even though the mobile radiotelephone is designed, manufactured and sold as a terminal intended for use with the mobile satellite radiotelephone system. One or more operators may offer both mobile and fixed telecommunications services over an overlapping geographic area using two separate transponders in separate satellites or within the same "hybrid" satellite, with one transponder supporting mobile satellite radiotelephones and the other supporting fixed satellite radiotelephones. As capacity "hot spots" or congestion develops within certain spot beams of the mobile radiotelephone system, the fixed system, with its much higher capacity, can deploy fixed retransmiting stations to relieve the capacity load of the mobile system.

Figure 2A:
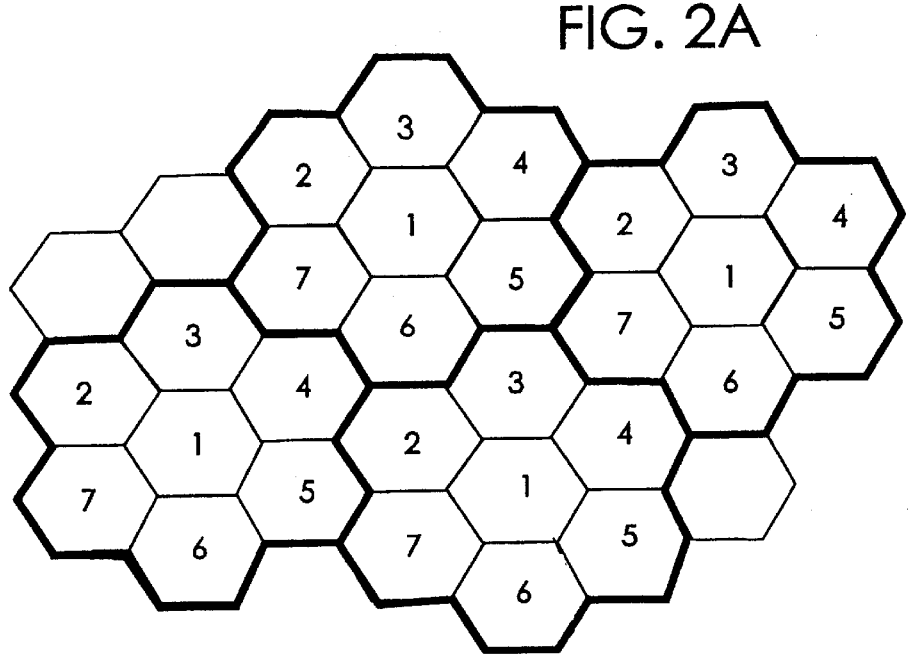
FIGS. 2A, 2B and 2C are schematic diagrams of frequency reuse in satellite radiotelephone systems.
Figure 2B:
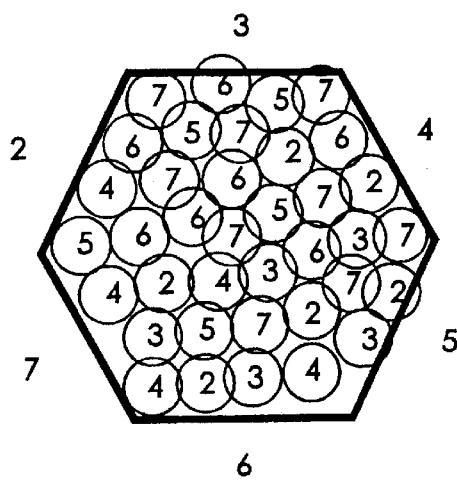
Figure 2C:
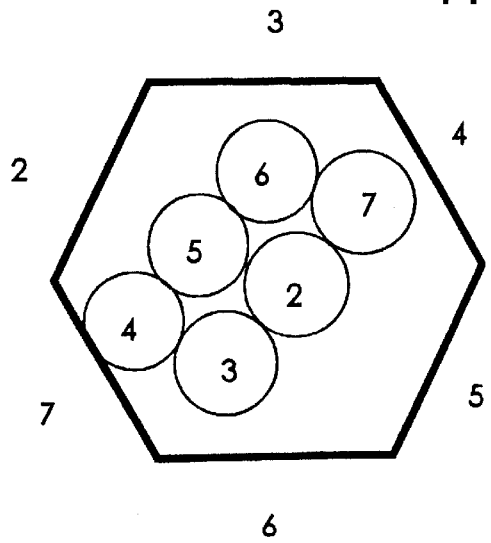

Referring to FIG. 2A, an exemplary seven-cell frequency reuse pattern, which may be used by the mobile satellite radiotelephone system 30, is shown. Within each of the relatively large mobile system cells, each typically being on the order of 400–600 kilometers in diameter, frequencies used by adjacent cells may be locally retransmitted by the retransmitting station at reduced, noninterfering power levels, and reused as shown in FIGS. 2B and 2C, thus substantially increasing the effective local capacity.

Accordingly, fixed retransmiting stations, located within the fixed system's footprint or coverage area, receive signals from the fixed satellite and retransmit these signals locally. Frequency translation to bring the signals within the mobile system's frequency band will generally be provided. In the reverse direction, the fixed retransmiting stations receive signals from mobile radiotelephones and retransmit signals from the mobile radiotelephones to the fixed satellite system. Again, frequency translation to bring the signals within the fixed system's frequency band will generally be provided.

The mobile radiotelephones are ordinarily used with the mobile satellite system. Accordingly, the fixed satellite system may need to be configured to support the air interface used by the mobile satellite radiotelephone system.

Alternatively, if different air interfaces are used by the fixed and mobile satellite radiotelephone systems, the fixed retransmitting station can perform a translation from one air interface to the other, for example by demodulation and remodulation. The fixed retransmiting station then becomes a regenerative repeater which reformats communications channels as well as control channels. However, if the mobile and fixed systems both use substantially the same air interface, then the fixed retransmitting station can function as a non-regenerative repeater.

A preferred embodiment may use the simplest fixed retransmiting station by having the fixed and mobile systems both utilize the same air interface standard. Alternatively, the fixed system is configured to support the mobile system air interface even though the fixed system may be using another air interface for fixed radiotelephone service.

Figure 3:
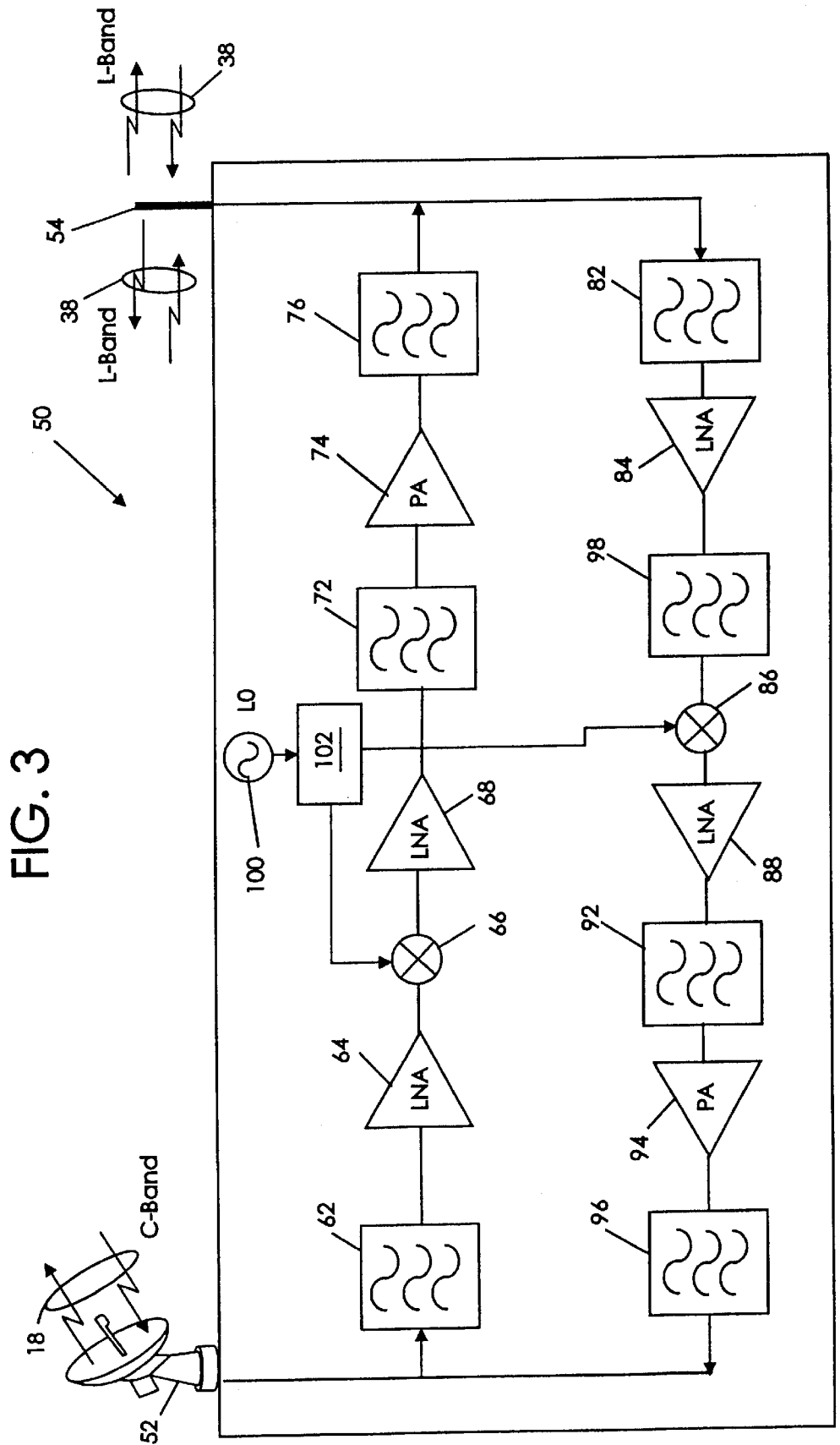
FIG. 3 is a block diagram of fixed retransmitting stations according to the present invention.

Referring now to FIG. 3, a preferred embodiment of a fixed retransmitting station 50 of FIG. 1 will be described. As shown in FIG. 3, the fixed retransmitting station 50 uses a first antenna 52 to communicate with the satellite 12 using the first air interface 18 and a second antenna 54 to communicate with the mobile radiotelephones 34 using the second air interface 38. Signals received from antenna 52 are retransmitted to antenna 54 using filter 62, low noise amplifier 64, frequency translator 66, low noise amplifier 68, filter 72, power amplifier 74 and filter 76. Signals received from antenna 54 are retransmitted to antenna 52 using filter 82, low noise amplifier 84, filter 98, frequency translator 86, low noise amplifier 88, filter 92, power amplifier 94 and filter 96. The designs of these components are well-known to those having skill in the art and need not be described further herein. A local oscillator 100 is used in conjunction with a frequency generator 102 for up and down conversion as necessary.

Accordingly, a band of frequencies within the forward link band of the fixed system which is set aside for retransmission by a particular fixed retransmitting station, is amplified, down-converted to the appropriate mobile system forward link band in accordance with the frequency planning/reuse scheme as shown on FIG. 2, amplified again and locally retransmitted. In the reverse direction, signals received from the mobile radiotelephones are amplified, up-converted to the appropriate fixed system return-link band reserved for the fixed retransmiting station, amplified again and transmitted to the satellite of the fixed satellite system using the receive/transmit directional antenna 52 of the fixed retransmitted station.

The fixed retransmitting station 50 forms a base station for a satellite radiotelephone system, including means for locating the base station in an overlapping area of a fixed satellite radiotelephone system and a mobile satellite radiotelephone communications system and means for retransmitting communications between the fixed satellite radiotelephone system and at least one of the mobile radiotelephones. If different air interfaces are used, the retranslating means can comprise means for converting communications between the first air interface and the second air interface as well. Capacity sharing between fixed and mobile satellite radiotelephone systems may thereby be provided.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A satellite radiotelephone system comprising:
    a fixed satellite radiotelephone system that communicates with a plurality of fixed radiotelephones in a first communication area;
    a mobile satellite radiotelephone system that communicates with a plurality of mobile radiotelephones in a second communication area, wherein the first and second communication areas overlap to define an overlapping area; and
    at least one fixed retransmitting station in the overlapping area, that retransmits communications from the fixed satellite radiotelephone system directly to at least one of the mobile radiotelephones and that retransmits communications directly received from at least one of the mobile radiotelephones to the fixed satellite radiotelephone system.

2. A satellite radiotelephone system according to claim 1:
    wherein the fixed satellite radiotelephone system and the mobile satellite radiotelephone system use a similar air interface; and
    wherein the at least one fixed retransmitting station is a fixed repeater that relays communications between the fixed satellite radiotelephone system and the at least one of the mobile radiotelephones using the similar air interface.

3. A satellite radiotelephone system according to claim 1:
    wherein the fixed satellite radiotelephone system uses a first air interface and the mobile satellite radiotelephone system uses a second air interface; and
    wherein the at least one fixed retransmitting station converts communications between the fixed satellite radiotelephone system and the at least one of the mobile radiotelephones, between the first air interface and the second air interface.

4. A satellite radiotelephone system according to claim 1 wherein the fixed satellite radiotelephone system has higher capacity than the mobile satellite radiotelephone system such that the at least one fixed retransmitting station provides additional capacity for the mobile satellite radiotelephone system using at least some of the higher capacity of the fixed satellite radiotelephone system.

5. A satellite radiotelephone system according to claim 4 wherein the at least one fixed retransmitting station is located at a congested area of the mobile satellite radiotelephone system in the overlapping area, to thereby provide additional capacity for the mobile satellite radiotelephone system in the congested area.

6. A satellite radiotelephone system comprising:
    a first satellite radiotelephone system that communicates with a plurality of first radiotelephones in a first communication area;
    a second satellite radiotelephone system that communicates with a plurality of second radiotelephones in a second communication area; and
    at least one retransmitting station in the first area, that retransmits communications from the first satellite radiotelephone system directly to at least one of the second radiotelephones and that retransmits communications directly received from at least one of the second radiotelephones to the first satellite radiotelephone system.

7. A satellite radiotelephone system according to claim 6:
    wherein the first satellite radiotelephone system and the second satellite radiotelephone system use a similar air interface; and
    wherein the at least one retransmitting station is a fixed repeater that relays communications between the first satellite radiotelephone system and the at least one of the second radiotelephones using the similar air interface.

8. A satellite radiotelephone system according to claim 6:
    wherein the first satellite radiotelephone system uses a first air interface and the second satellite radiotelephone system uses a second air interface; and
    wherein the at least one retransmitting station converts communications between the first satellite radiotelephone system and the at least one of the second radiotelephones, between the first air interface and the second air interface.

9. A satellite radiotelephone system according to claim 6 wherein the first satellite radiotelephone system has higher capacity than the second satellite radiotelephone system such that the at least one retransmitting station provides additional capacity for the second satellite radiotelephone system using at least some of the higher capacity of the first satellite radiotelephone system.

10. A satellite radiotelephone system according to claim 9 wherein the at least one fixed retransmitting station is located at a congested area of the second satellite radiotelephone system, to thereby provide additional capacity for the second satellite radiotelephone system in the congested area.

11. A base station for a satellite radiotelephone system, comprising:
    means for locating the base station in an overlapping area of a fixed satellite radiotelephone system that communicates with a plurality of fixed radiotelephones and a mobile satellite radiotelephone system that communicates with a plurality of mobile radiotelephones; and
    means for retransmitting communications from the fixed satellite radiotelephone system directly to at least one of the mobile radiotelephones and for retransmitting communications directly received from at least one of the mobile radiotelephones to the fixed satellite radiotelephone system.

12. A base station according to claim 11:
    wherein the fixed satellite radiotelephone system and the mobile satellite radiotelephone system use a similar air interface; and
    wherein the retransmitting means comprises repeating means for relaying communications between the fixed satellite radiotelephone system and the at least one of the mobile radiotelephones using the similar air interface.

13. A base station according to claim 11:
  wherein the fixed satellite radiotelephone system uses a first air interface and the mobile satellite radiotelephone system uses a second air interface; and
  wherein the retransmitting means comprises means for converting communications between the fixed satellite radiotelephone system and the at least one of the mobile radiotelephones, between the first air interface and the second air interface.

14. A base station according to claim 11 wherein the fixed satellite radiotelephone system has higher capacity than the mobile satellite radiotelephone system such that the base station provides additional capacity for the mobile satellite radiotelephone system using at least some of the higher capacity of the fixed satellite radiotelephone system.

15. A base station according to claim 14 wherein the base station is located at a congested area of the mobile satellite radiotelephone system in the overlapping area, to thereby provide additional capacity for the mobile satellite radiotelephone system in the congested area.

16. A capacity sharing method for a fixed satellite radiotelephone system that communicates with a plurality of fixed radiotelephones in a first communication area; and a mobile satellite radiotelephone system that communicates with a plurality of mobile radiotelephones in a second communication area, wherein the first and second communication areas overlap to define an overlapping area, the capacity sharing method comprising the step of:
  retransmitting communications from the fixed satellite radiotelephone system directly to at least one of the mobile radiotelephones and retransmitting communications directly received from at least one of the mobile radiotelephones to the fixed satellite radiotelephone system, in the overlapping area.

17. A method according to claim 16 wherein the fixed satellite radiotelephone system and the mobile satellite radiotelephone system use a similar air interface, the retransmitting step comprising the step of:
  relaying communications between the fixed satellite radiotelephone system and the at least one of the mobile radiotelephones using the similar air interface.

18. A method according to claim 16 wherein the fixed satellite radiotelephone system uses a first air interface and the mobile satellite radiotelephone system uses a second air interface, the retransmitting step comprising the step of:
  converting communications between the fixed satellite radiotelephone system and the at least one of the mobile radiotelephones, between the first air interface and the second air interface.

19. A method according to claim 16 wherein the fixed satellite radiotelephone system has higher capacity than the mobile satellite radiotelephone system such that the retransmitting step provides additional capacity for the mobile satellite radiotelephone system using at least some of the higher capacity of the fixed satellite radiotelephone system.

20. A capacity sharing method for a first satellite radiotelephone system that communicates with a plurality of first radiotelephones in a first communication area and a second satellite radiotelephone system that communicates with a plurality of second radiotelephones in a second communication area, the capacity sharing method comprising the step of:
  retransmitting communications from the first satellite radiotelephone system directly to at least one of the second radiotelephones and retransmitting communications directly received from at least one of the second radiotelephones to the first satellite radiotelephone system.

21. A method according to claim 20 wherein the first satellite radiotelephone system and the second satellite radiotelephone system use a similar air interface, the retransmitting step comprising the step of:
  relaying communications between the first satellite radiotelephone system and the at least one of the second radiotelephones using the similar air interface.

22. A method according to claim 20 wherein the first satellite radiotelephone system uses a first air interface and the second satellite radiotelephone system uses a second air interface, the retransmitting step comprising the step of:
  converting communications between the first satellite radiotelephone system and the at least one of the second radiotelephones, between the first air interface and the second air interface.

23. A method according to claim 20 wherein the first satellite radiotelephone system has higher capacity than the second satellite radiotelephone system such that the retransmitting step provides additional capacity for the second satellite radiotelephone system using at least some of the higher capacity of the first satellite radiotelephone system.

24. A capacity sharing method for a satellite radiotelephone system, comprising the steps of:
  locating a base station in an overlapping area of a fixed satellite radiotelephone system that communicates with a plurality of fixed radiotelephones and a mobile satellite radiotelephone system that communicates with a plurality of mobile radiotelephones; and
  retransmitting communication from the fixed satellite radiotelephone system directly to at least one of the mobile radiotelephones using the base station and retransmitting communications directly received from at least one of the mobile radiotelephones to the fixed satellite radiotelephone system.

25. A method according to claim 24 wherein the fixed satellite radiotelephone system and the mobile satellite radiotelephone system use a similar air interface, the retransmitting step comprising the step of:
  relaying communications between the fixed satellite radiotelephone system and the at least one of the mobile radiotelephones using the similar air interface.

26. A method according to claim 24 wherein the fixed satellite radiotelephone system uses a first air interface and the mobile satellite radiotelephone system uses a second air interface, the retransmitting step comprising the step of:
  converting communications between the fixed satellite radiotelephone system and the at least one of the mobile radiotelephones, between the first air interface and the second air interface.

* * * * *

UNITED STATES PATENT AND TRADEMARK OFFICE
CERTIFICATE OF CORRECTION

PATENT NO.     :   6,052,586
DATED          :   April 18, 2000
INVENTOR(S)    :   Peter D. Karabinis It is certified that error appears in the above-identified patent and that said Letters Patent is hereby corrected as shown below:

Title page, item
[56] Reference Cited - please add:

Delli Priscoli et al., "Study of the Integration Between the GSM Cellular Network and a Satellite System," Proceedings of Globecom '93, IEEE Global Telecommunications Conference, Vol. 1, pp. 588-592

International Search Report, PCT/US98/17932, January 25, 1999

Signed and Sealed this

Twentieth Day of March, 2001

*Attest:*

NICHOLAS P. GODICI

*Attesting Officer*     *Acting Director of the United States Patent and Trademark Office*